United States Patent [19]

Bendickson

[11] Patent Number: 4,760,967
[45] Date of Patent: Aug. 2, 1988

[54] MULCHER-CHOPPER

[76] Inventor: Orrin C. Bendickson, Rte. 1, Mora, Minn. 55051

[21] Appl. No.: 931,527

[22] Filed: Nov. 17, 1986

[51] Int. Cl.⁴ ............................................. B02C 18/12
[52] U.S. Cl. .................................. 241/101.7; 241/239; 241/242; 241/292.1
[58] Field of Search ................... 241/101.7, 224, 282.1, 241/292.1, 282.2, 239, 240, 242, 101.2, 293

[56] References Cited

U.S. PATENT DOCUMENTS

| | | | |
|---|---|---|---|
| 1,236,259 | 8/1917 | Bullock | 241/293 X |
| 1,408,850 | 3/1922 | Webb | 241/292.1 |
| 1,666,014 | 4/1928 | Kershner | 241/242 |
| 2,822,846 | 2/1958 | Ward . | |
| 2,847,224 | 8/1958 | Stout . | |
| 2,861,611 | 11/1958 | Considder . | |
| 3,049,857 | 8/1962 | Shaw . | |
| 3,100,371 | 8/1963 | Redmon . | |
| 3,157,015 | 11/1964 | Russell et al. . | |
| 3,527,278 | 9/1970 | Johnson | 241/101.7 |
| 3,531,923 | 10/1970 | DeLay . | |
| 3,593,930 | 7/1971 | Lautzenheiser | 241/188 R |
| 3,608,838 | 9/1971 | Lundin et al. | 241/101.7 X |
| 3,674,220 | 7/1972 | Tupper et al. | 241/186 R |
| 3,688,479 | 9/1972 | Martinson et al. | 56/13.2 |
| 3,716,090 | 2/1973 | Lautzenheiser | 56/501 |
| 3,808,782 | 5/1974 | McWilliams | 56/16.9 |
| 3,817,462 | 6/1974 | Hamlin | 241/101.7 |
| 3,841,571 | 10/1974 | Dankel et al. | 241/101.7 |
| 3,861,603 | 1/1975 | Lautzenheiser et al. | 241/100 |
| 3,908,913 | 9/1975 | Cushman | 241/101.7 |
| 3,908,914 | 9/1975 | Cushman | 241/101.7 |
| 3,963,184 | 6/1976 | Grimm | 241/101.1 |
| 4,057,952 | 11/1977 | Brokaw | 56/16.9 |
| 4,076,460 | 2/1978 | Roof | 417/236 |
| 4,283,018 | 8/1981 | Richard | 241/101.1 |

Primary Examiner—Mark Rosenbaum
Attorney, Agent, or Firm—Richard E. Brink

[57] ABSTRACT

A mulcher-chopper of the type in which a horizontally disposed blade is mounted on a driven vertical shaft within a comminuting chamber. The blade is provided with deep and sharp serrations, thereby increasing the effective blade length and enhancing efficiency. Desirably the blade is oriented at an angle so that rotation provides a downdraft that helps move material into the comminuting chamber. A rigid bar, or anvil, extends diametrically across the comminuting chamber, and the blade is juxtaposed thereto, thus providing a highly effective shearing action.

9 Claims, 3 Drawing Sheets

MULCHER-CHOPPER

BACKGROUND OF THE INVENTION

This invention relates to mulcher-choppers and is particularly concerned with a mulcher-chopper having novel cutting means.

Mulcher-choppers are devices into which vegetation such as leaves, grass, twigs, and branches are introduced and reduced to small pieces. To some extent a rotary lawn mower functions in this manner, especially if the discharge opening is partially obstructed. More sophisticated mulcher-choppers have been developed utilizing the same basic principle of a blade mounted on a vertical shaft and rotating horizontally within a fixed chamber having an upper opening and a peripherally located discharge chute, the material to be comminuted being introduced through the opening, chopped, and discharged through the chute. Devices of this general type are shown, e.g., in U.S. Pat. Nos. 3,527,278 and 3,592,930. Although devices of this type have been functional to an extent, a need has existed for a mulcher-chopper that would be more effective and capable of handling coarser feed material.

BRIEF SUMMARY

The present invention provides an improved mulcher-chopper of the type in which a comminuting chamber is defined by a lower plate, an upper plate having a feed opening, and a peripheral wall interposed between the two plates with a discharge chute. As in the prior art, a vertical shaft extends through both plates and is journaled therein, with a radially extending blade mounted on and extending from the shaft. In accordance with the present invention, however, the blade is made of fairly heavy gauge metal and is provided with deep, sharpened serrations along its leading edge. If the blade is canted at an angle, e.g., 45°, it can also create a substantial downdraft during rotation, thereby assisting in drawing the feed material into the comminuting chamber. Further, if a rigid bar is positioned above the blade, extending diametrically across the chamber and placed in juxtaposition to the blade, an extremely efficient shearing action takes place during operation. Devices made in accordance with the invention will be especially valuable to gardeners, nursery owners, golf course groundskeepers, persons owning large lots, etc.

BRIEF DESCRIPTION OF THE DRAWING

Understanding of the invention will be enhanced by referring to the accompanying drawing, in which like numbers refer to like parts in the several views, and in which.

DESCRIPTION OF A PRESENTLY PREFERRED EMBODIMENT

Figure 2:
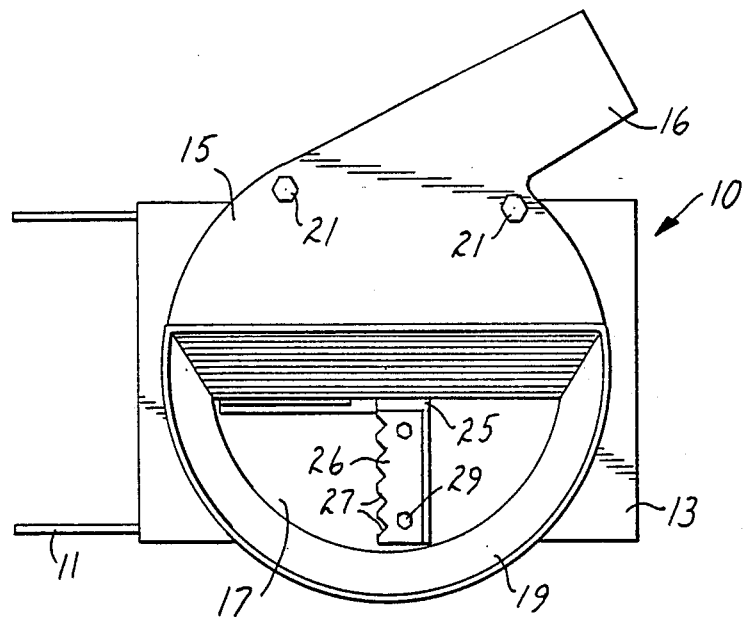
FIG. 2 is a plan view of the mulcher-chopper.
Figure 1:
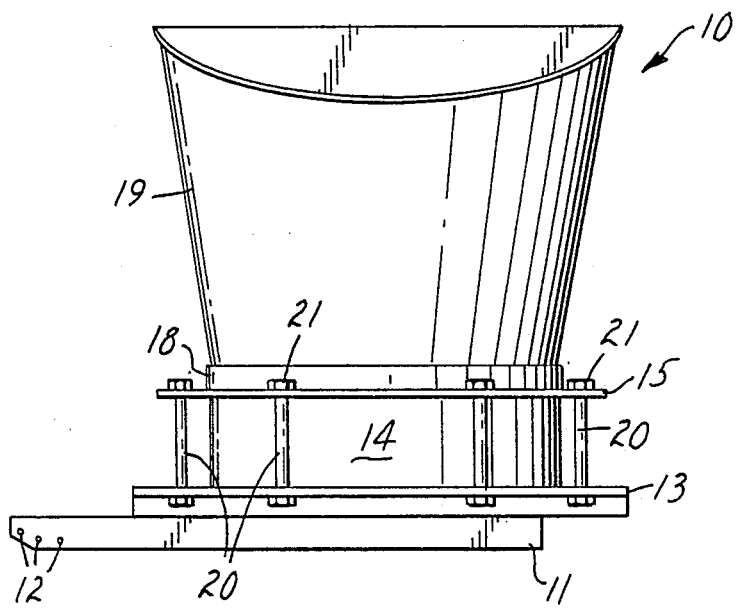
FIG. 1 is an elevation view of the mulcher-chopper of the invention.
Figure 3:
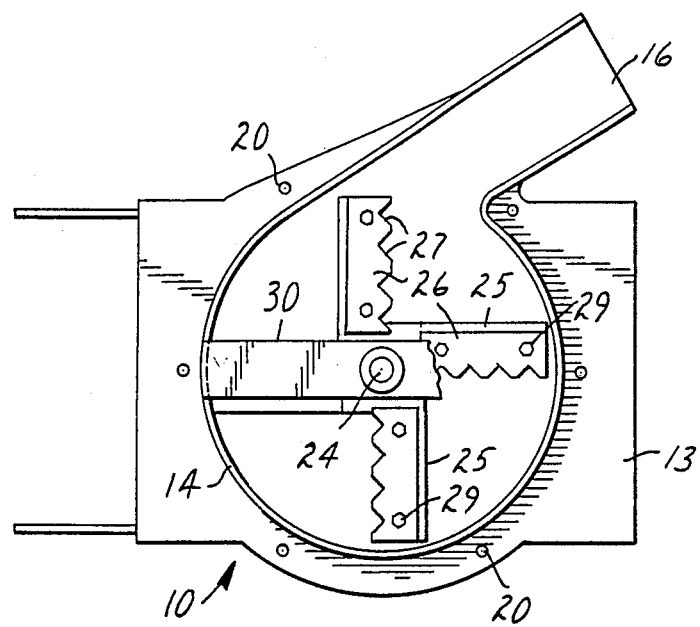
FIG. 3 is plan view similar to that of FIG. 1, with the feed hopper and upper plate of the comminuting chamber removed.

In the drawings, mulcher-chopper 10 comprises bracket 11, having holes 12 to provide a simple means for mounting on the front of a conventional riding mower. Positioned above and connected to bracket 11 is a comminuting chamber made up of lower plate 13 and upper plate 15, separated by peripheral wall 14 and having, at one peripheral portion, discharge chute 16. A flexible pipe or tube may be connected to the mouth of chute 16 to convey discharged comminuted material to a bag at the rear of the riding mower on which mulcher-chopper 10 is mounted. Upper plate 15 is provided with opening 17, surrounded by flange 18 to permit introduction of material to be comminuted. Hopper 19 is mounted within flange 18 to facilitate the introduction of material to the comminuting chamber. Tubular spacers 20 extend between the confronting surfaces of lower plate 13 and upper plate 15 around the exterior of wall 14, bolts 21 extending through spacers 20 and providing a means for holding the comminuting chamber together.

At the central portions of lower plate 13 and upper plate 15, respectively, are bearings 22 and 23, within which is journaled shaft 24. Pulley 31 is firmly mounted on an external end of shaft 24 to provide a means for driving shaft 24, driving power normally being supplied by the riding mower on which the mulcher-chopper is mounted, thus eliminating the need for a separate motor. Rotational speeds of 1500-3000 RPM have been found effective in chopping and comminuting one-inch poplar branches. Within the comminuting chamber, mounted fixedly on shaft 24, is blade holder 25, comprising hub 25a, from which four arms extend radially; on each arm is mounted a blade 26, having deep and sharp serrations 27 along the leading edge. Serrations 27 increase the effective cutting surface of blade 26 and also provide for cutting to occur at more than one angle, further enhancing effectiveness. Blade 26 is provided with slots 28 to permit adjusting its vertical position, bolts 29 attaching blade 26 to the blade holder 25.

Figure 4:
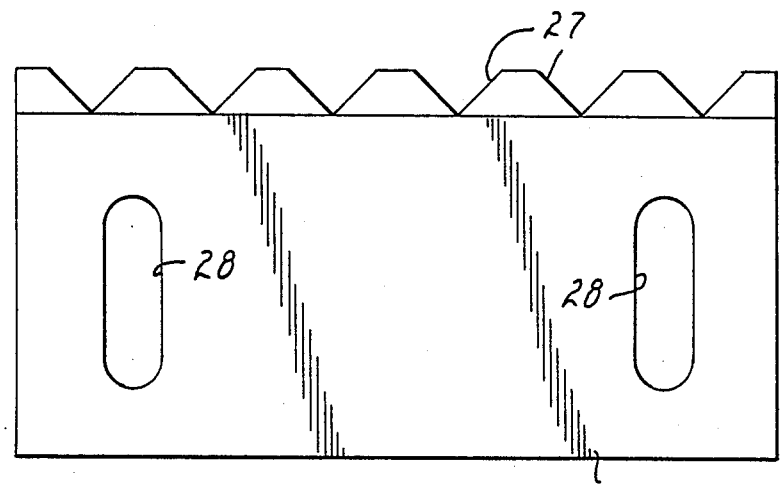
FIG. 4 is a view of the lower side of the serrated blade employed in the mulcher-chopper of the invention.
Figure 5:
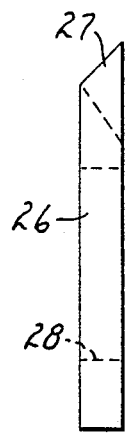
FIG. 5 is an end view of the blade of FIG. 4.
Figure 6:
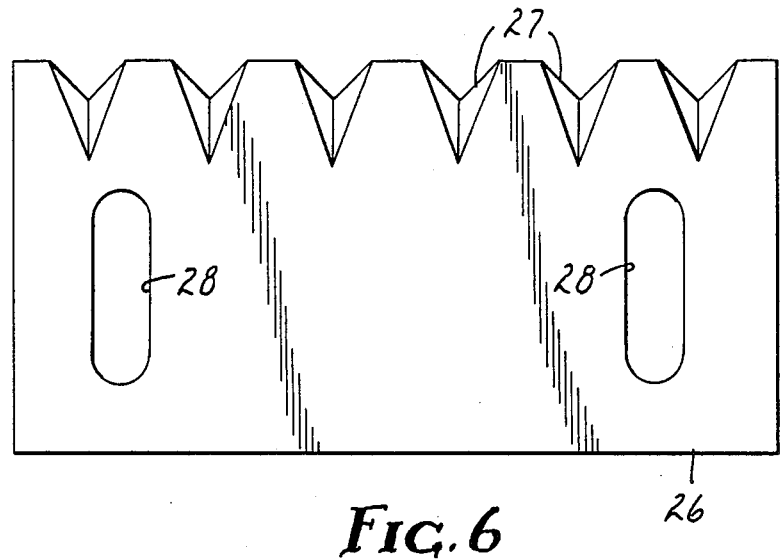
FIG. 6 is a view of the upper side of the serrated blade of FIG. 4.
Figure 7:
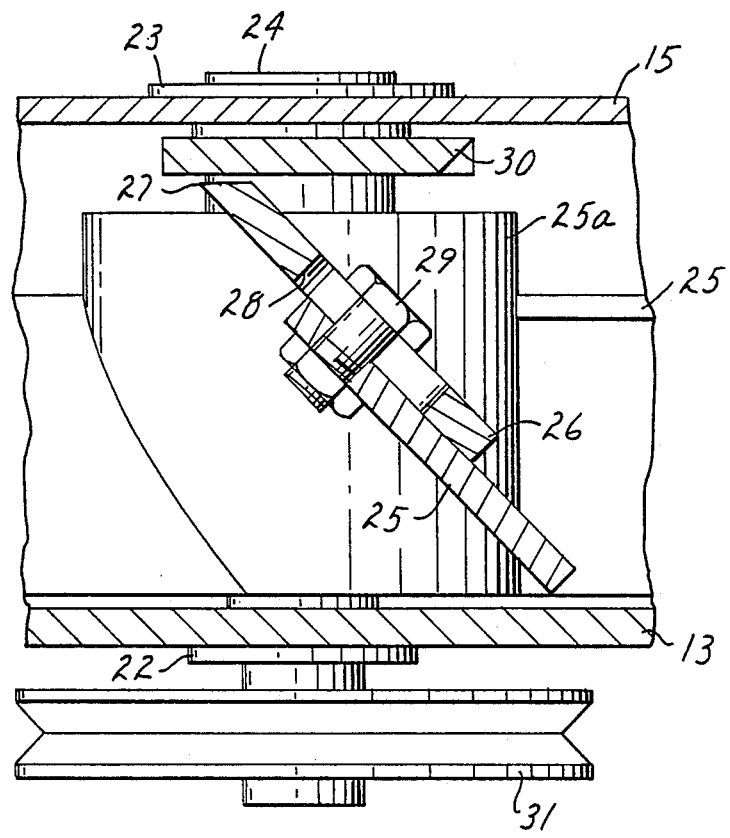
FIG. 7 is a cross-sectional end view of the blade mounted on a blade holder.

As will be seen in the drawing, especially in FIGS. 4 and 5, blade 26 is made of heavy gauge metal, one edge of which is beveled along its entire length to provide a sharpened cutting edge. The beveled surface is positioned substantially parallel to plates 13 and 15, with the sharpened edge oriented in the direction of blade roation. Blade 26 is further provided with generally V-shaped linear serrations so as to define teeth sharpened along the beveled edge, thereby increasing the effect cutting length of blade 26 and providing means for cutting at more than one angle.

Extending diametrically across the comminuting chamber and in vertical juxtaposition to blades 26 is anvil 30, which is a fairly thick rigid bar. Blades 26 are adjusted so that the clearance between them and anvil 30 is fairly close, e.g., 1/16 inch, thereby providing an extremely effective shearing action with respect to any marterial introduced into the comminuting chamber. As a further aid to enhancing the effectiveness of mulcher-chopper 10, blade holder 25 (and hence blade 26) is oriented at an angle, e.g., 45°, to the horizontal, so that the leading edge of blade 26 approaches anvil 30 so that cutting occurs at an obtuse angle, e.g., 135°, thereby causing a downdraft to be generated and thus assist in moving material downward into the comminuting chamber.

What I claim is as follows:

1. In a mulcher-chopper including a comminuting chamber defined by an upper plate, a lower plate, and an interposed peripheral wall, a discharge chute extending from said wall, a shaft extending through both plate and journaled therein, a radially extending blade mounted fixedly on said shaft within said chamber, and means for driving said shaft, the improvement comprising the cutting edge of the blade's being made of heavy gauge metal, one edge of said blade being beveled along its entire length to provide a sharpened cutting edge, the beveled surface being positioned substantially parallel to said plates, with the sharpened edge oriented in the direction of blade rotation, said blade being further provided with generally V-shaped linear serrations so as to define teeth sharpened along the beveled edge, thereby increasing the effective cutting length of said blade and providing means for cutting at more than one angle.

2. The mulcher-chopper of claim 1 wherein a radially extending blade holder is mounted on the shaft and the blade is adjustably mounted on the blade holder.

3. The mulcher-chopper of claim 2 wherein the blade holder has four radially extending arms, on each of which a blade is mounted.

4. The mulcher-chopper of claim 3 wherein a rigid bar, or anvil, extends diametrically across the comminuting chamber, the lower surface of the bar being positioned closely adjacent to the leading edge of the blade as the shaft rotates, thereby providing a highly effective shearing action.

5. The mulcher-chopper of claim 4 wherein the blade holder is canted, so that the leading edge of the blade approaches the anviil at an obtuse angle.

6. The mulcher-chopper of claim 5 wherein means is provided on the blade or the holder to permit adjustment of the blade with respect to the anvil.

7. The mulcher-chopper of claim 6, supported by a bracket adapted for mounting on a riding mower.

8. A mulcher-chopper comprising in combination a comminuting chamber defined by an upper plate, a lower plate, and an interposed peripheral wall, a discharge chute extending from said wall, a shaft extending through and journaled in the center of each of said plates, a blade fixedly connected to said shaft between said plates, said blade being made of heavy gauge metal, one edge of said blade being beveled along its entire length to provide a sharpened cutting edge, the beveled surface being positioned substantially parallel to said plates, with the sharpened edge oriented in the direction of blade rotation, said blade being further provided with generally V-shaped linear serrations so as to define teeth sharpened along the beveled edge, said upper plate having an opening through which material can be introduced into the comminuting chamber, a hopper fitted into said opening, and means for rotating the shaft.

9. The mulcher-chopper of claim 8 wherein the opening in the hopper plate is surrounded by an integral flange, the lower end of the hopper being connected to the flange.

* * * * *